May 9, 1950  C. C. DAVIS ET AL  2,507,247
BRUSH CUTTER
Filed Aug. 17, 1948  2 Sheets-Sheet 1
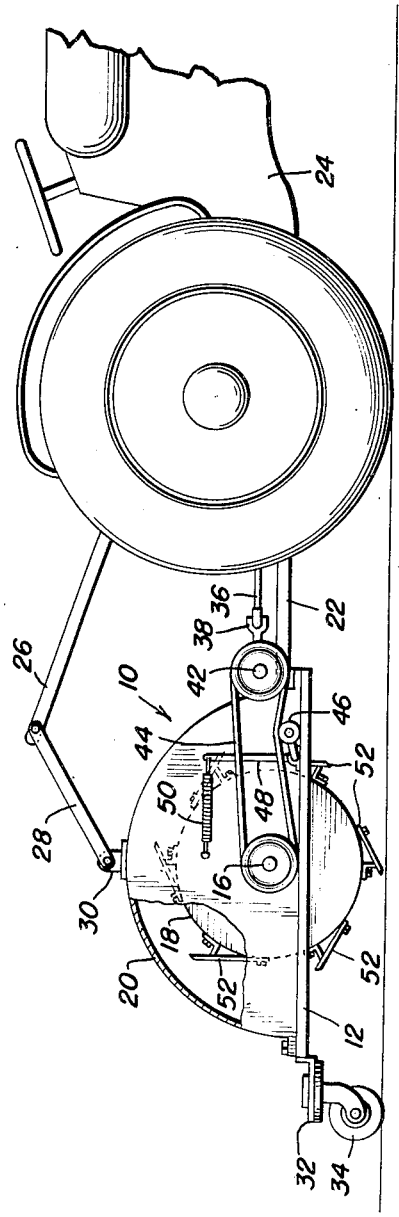
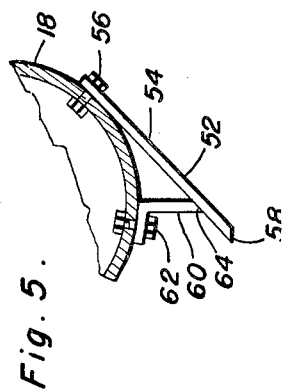
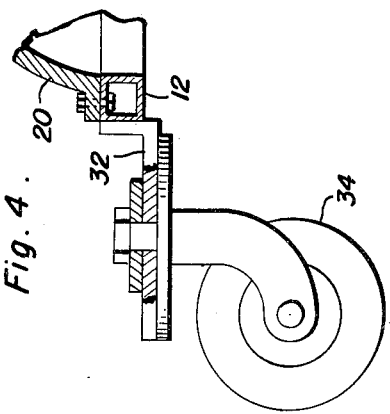
Clarence C. Davis
Paul Covalt
INVENTORS
BY *Clarence A. O'Brien*
*and Harvey B. Jacobson*
Attorneys May 9, 1950     C. C. DAVIS ET AL     2,507,247
BRUSH CUTTER
Filed Aug. 17, 1948     2 Sheets-Sheet 2
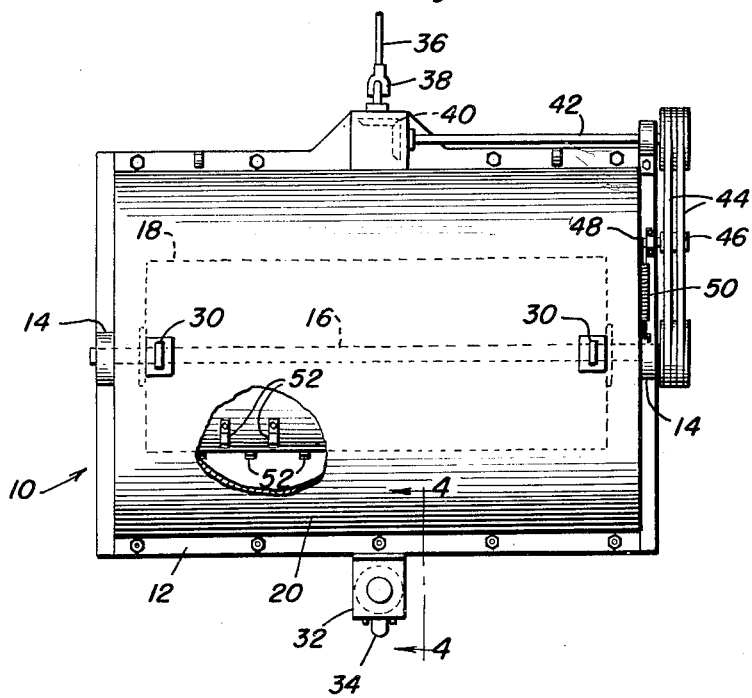
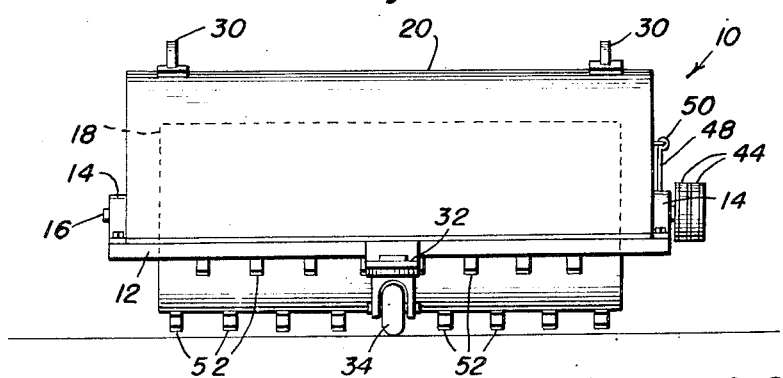
Clarence C. Davis
Paul Covalt
INVENTORS Patented May 9, 1950

2,507,247

UNITED STATES PATENT OFFICE 2,507,247

BRUSH CUTTER

Clarence C. Davis and Paul Covalt, Mooreland, Okla.; said Davis assignor to Arnold Covalt, Woodward County, Okla.

Application August 17, 1948, Serial No. 44,766

2 Claims. (Cl. 56—26)

This invention relates to new and useful improvements and structural refinements in brush cutters and similar machines for cutting brush, and the like, and the principal object of the invention is to facilitate performance of the brush cutting operation in a highly convenient and an expeditious manner.

This object is achieved by the provision of a brush cutter wherein a rotatable drum carries a plurality of cutting members, the drum being power driven and the members being engageable with the brush, the cutting members being particularly adapted to withstand the hard work to which they are subjected without damage.

An important feature of the invention resides in the provision of a brush cutter which assumes the form of an attachment for a tractor, or the like, the rotatable drum of the cutter being driven from the power take-off of the tractor and the cutter being liftable and lowerable with respect to the ground by the usual lift mechanism with which the tractor is provided.

An additional feature of the invention resides in the provision of a traveling wheel on the brush cutter frame, whereby the cutting members on the rotatable drum are maintained at a predetermined level with respect to the ground.

An important advantage of the invention lies in its simplicity of construction, convenience of operation, and in its adaptability to economical manufacture.

With the above more important objects in view and such other objects as may become apparent as this specification proceeds, the invention consists essentially of the construction and arrangement of parts as shown in the accompanying drawing in which:

Figure 1 is a side elevational view of the invention shown in association with a tractor, the invention being partially broken away so as to reveal its construction;

Figure 2 is a top plan view of the invention per se, also partly broken away;

Figure 3 is a rear elevational view of the invention;

Figure 4 is a cross sectional view, taken substantially in the plane of the line 4—4 in Figure 2, and Figure 5 is a fragmentary cross sectional view, showing the attachment of one of the cutting members to the drum used in the invention.

Like characters of reference are employed to designate like parts in the specification and throughout the several views.

Referring now to the accompanying drawings in detail, the general reference character 10 designates a brush cutter constructed in accordance with the teachings of this invention, the same consisting of a substantially rectangular frame 12 of box-shaped cross sectional configuration, the side members of which are provided with a pair of bearings 14 in which a shaft 16 is rotatably journaled.

A rotatable drum 18 is rigidly secured to the shaft 16, this drum being horizontally disposed and the upper portion thereof being covered by a substantially semi-cylindrical shield 20 secured to the frame 12.

The frame 12 is connected by means of a suitable drawbar 22 to the hitch of a tractor 24, or the like (see Figure 1), the tractor also including a manually or mechanically operated lift mechanism 26 of a conventional type. This lift mechanism includes a pair of links 28 which are pivoted to suitable brackets 30 provided on the shield 20, and it will be apparent that by raising or lowering the mechanism 26, the entire brush cutter 10 may be raised or lowered with respect to the ground.

The rear end portion of the frame 12 is equipped with a suitable bracket 32, the same carrying a swivelled caster or wheel 34, intended to travel along the ground when the brush cutter is in its lowered position. It will be apparent that by virtue of the wheel 34, the drum 18 is effectively prevented from being lowered too close to the ground.

The drum 18 is driven from the usual power take-off shaft 36 of the tractor 24, the shaft 36 being connected by means of a universal joint 38 and by means of a suitable gear box 40 to a countershaft 42 rotatably mounted on the frame 12. A double belt drive 44 operatively connects the countershaft 42 to the shaft 16, and suitable tensioning means are provided on the frame 12 for the drive 44, such as for example, a pair of "jockey" pulleys 46 which are urged in engagement with the belt 44 by means of a suitable lever 48 and a tension spring 50, as will be clearly apparent.

A plurality of cutting members 52 are provided on the circumferential surface of the drum 18, these cutting members preferably being disposed in rows extending longitudinally of the drum and each cutting member comprising an elongated blade 54 secured at one end portion thereof to the drum as at 56 while its remaining end terminates in a beveled cutting edge 58 (see Figure 5). It is to be noted that the blade 54 extends outwardly from the drum in a plane which is angularly offset from a true radial plane of the drum, in other words, the blade 54 is disposed substantially in a tangential relation to the drum, substantially as shown. For purposes of reinforcement an angulated strut or bracket 60 may be secured to the drum 18 as at 62 and may engage an intermediate portion of the blade 54 as at 64, so as to prevent the blade from collapsing toward the drum. If desired, the point of contact of the strut 60 with the blade 54 may be welded, to prevent the blade from bending outwardly from the drum.

In any event, when the invention is placed in use, rotation of the drum 18 will cause the cutting edges 58 of the several blades 54 to engage the brush, or the like, whereby the cutting operation will be effectively performed. It is to be noted that the arrangement of the wheel 34 is such that when the brush cutter is in its lowered position, the cutting members 52 are barely engageable with the ground. Needless to say, the entire cutting attachment may be raised by means of the mechanism 26 when the implement is traveling from one site of operation to another.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having thus described the invention, what is claimed as new:

1. In a brush cutter, the combination of a cylindrical drum rotatable on a horizontal axis, a flat cutting blade secured at one end thereof to the outer surface of said drum and extending tangentially therefrom, and an L-shaped bracket including a relatively short arm secured to the drum and a relatively long arm extending radially from the latter, said long arm having its outer end secured to an intermediate portion of said blade.

2. The device as defined in claim 1 wherein the outer end of said blade terminates in a bevelled surface.

CLARENCE C. DAVIS.
PAUL COVALT.

REFERENCES CITED

The following references are of record in the file of this patent:

UNITED STATES PATENTS

| Number | Name | Date |
|---|---|---|
| 654,617 | Fitzgerald | July 31, 1900 |
| 1,001,215 | Murphy | Aug. 22, 1911 |
| 1,311,382 | Cureton | July 29, 1919 |
| 1,698,724 | Johnston et al. | Jan. 15, 1925 |
| 1,831,658 | Gronig et al. | Nov. 10, 1931 |
| 2,319,458 | Hornish | May 18, 1943 |
| 2,341,486 | Swertfeger | Feb. 8, 1944 |
| 2,387,070 | Hilblom | Oct. 16, 1945 |